(12) United States Patent
Kuhn et al.

(10) Patent No.: US 12,246,933 B2
(45) Date of Patent: Mar. 11, 2025

(54) STACKING APPARATUS AND STACKING METHOD

(71) Applicant: AUTEFA SOLUTIONS GERMANY GMBH, Friedberg (DE)

(72) Inventors: Rudolf Kuhn, Neusäß (DE); Peter Knobloch, Gersthofen (DE)

(73) Assignee: AUTEFA SOLUTIONS GERMANY GMBH, Friedberg (DE)

(*) Notice: Subject to any disclaimer, the term of this patent is extended or adjusted under 35 U.S.C. 154(b) by 0 days.

(21) Appl. No.: 18/559,111

(22) PCT Filed: May 19, 2022

(86) PCT No.: PCT/EP2022/063543
§ 371 (c)(1),
(2) Date: Nov. 6, 2023

(87) PCT Pub. No.: WO2022/243420
PCT Pub. Date: Nov. 24, 2022

(65) Prior Publication Data
US 2024/0246781 A1 Jul. 25, 2024

(30) Foreign Application Priority Data
May 19, 2021 (DE) .................... 20 2021 102 751.7

(51) Int. Cl.
B65G 57/00 (2006.01)
B65G 57/03 (2006.01)
B65G 61/00 (2006.01)

(52) U.S. Cl.
CPC ......... B65G 57/005 (2013.01); B65G 57/035 (2013.01); B65G 61/00 (2013.01)

(58) Field of Classification Search
CPC ...... B65G 61/00; B65G 47/086; B65G 57/24; B65G 57/00; B65G 57/03; B65G 1/0407; B65G 57/005; B65G 57/035; B65B 35/50
See application file for complete search history.

(56) References Cited

U.S. PATENT DOCUMENTS

| 4,850,783 | A |   | 7/1989  | Maekawa |              |
|-----------|---|---|---------|---------|--------------|
| 5,562,403 | A | * | 10/1996 | Winski  | B65G 57/245  |
|           |   |   |         |         | 414/791.6    |
| 9,926,147 | B2| * | 3/2018  | Kuhn    | B65G 57/035  |

FOREIGN PATENT DOCUMENTS

| CN |   | 108584451 A |   | 9/2018 |             |
|----|---|-------------|---|--------|-------------|
| DE |   | 2063677 A1  | * | 7/1972 | B65G 57/035 |

(Continued)

Primary Examiner — Gregory W Adams
(74) Attorney, Agent, or Firm — McGlew and Tuttle, P.C.

(57) ABSTRACT

A stacking apparatus and method for product layers, it loads each of the product layers in a box-like and stackable slip-on container, open at the bottom, and stores the product layer with this container in a container stack, and/or removes product layers in slip-on containers from a container stack and unloads the individual product layer from the slip-on container. A handling apparatus having a multi-axially movable handling device for the slip-on containers, wherein the handling device is designed to handle the slip-on containers and wherein the product layers in the container stack are located on a container base of a lower slip-on container and are surrounded laterally and at the top by an upper slip-on container positioned above said lower slip-on container. A row arrangement of a plurality of stacking places, having a movable support which moves the handling device along a first, facing side of the row arrangement.

14 Claims, 7 Drawing Sheets

(56) References Cited

FOREIGN PATENT DOCUMENTS

| | | | | |
|---|---|---|---|---|
| DE | 20307071 | U1 | 8/2003 | |
| DE | 202013103400 | U1 * | 11/2014 | ............ B65G 57/02 |
| DE | 202014100905 | U1 | 5/2015 | |
| EP | 3730434 | A1 | 10/2020 | |
| JP | 62012523 | A * | 1/1987 | ............ B65G 57/03 |
| JP | 62074832 | A * | 4/1987 | ............ B65G 57/06 |
| JP | S6399187 | A | 4/1988 | |
| JP | H04121906 | U | 10/1992 | |
| JP | 07196165 | A * | 8/1995 | ............ B65G 61/00 |
| WO | 2008138556 | A2 | 11/2008 | |
| WO | 2015128452 | A1 | 9/2015 | |

* cited by examiner

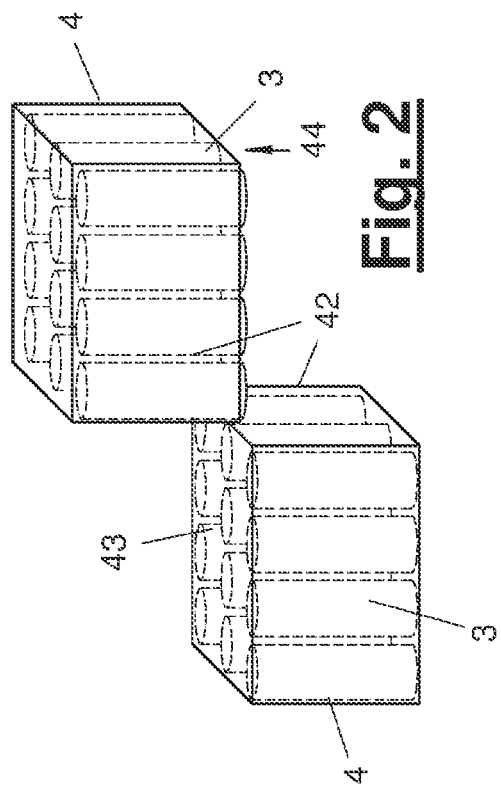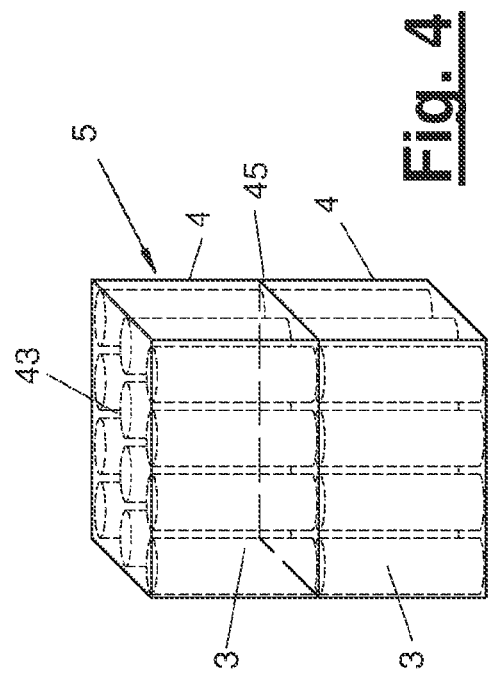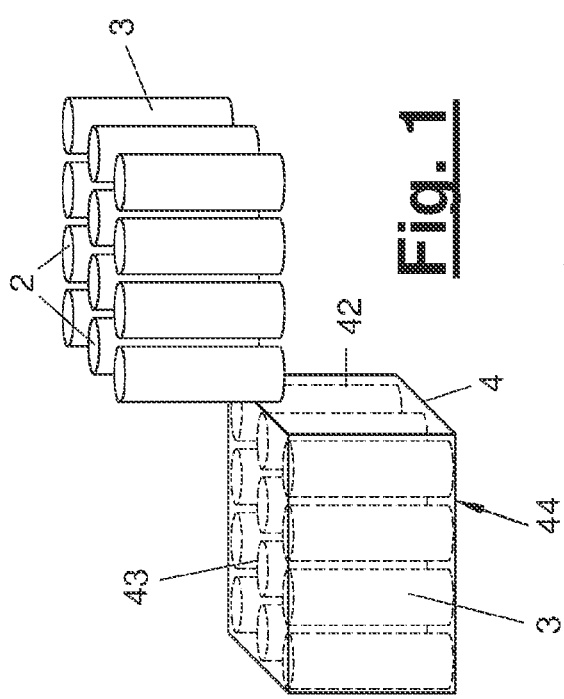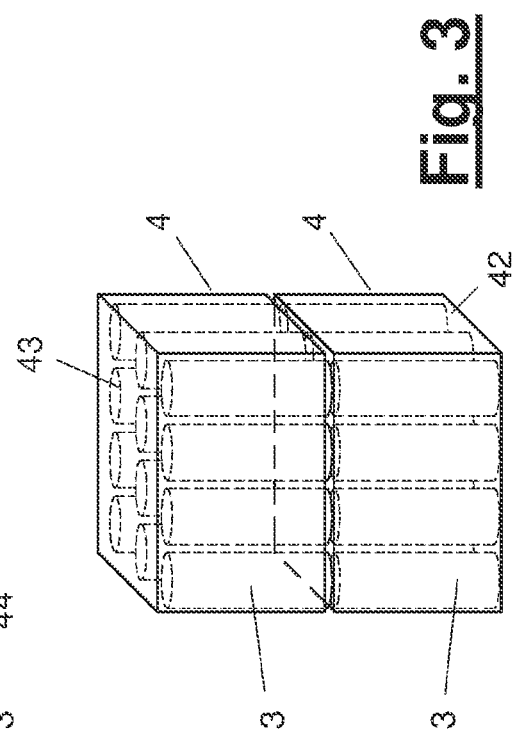

STACKING APPARATUS AND STACKING METHOD

CROSS REFERENCE TO RELATED APPLICATIONS

This application is a United States National Phase Application of International Application PCT/EP2022/063543, filed May 19, 2022, and claims the benefit of priority under 35 U.S.C. § 119 of German Application 20 2021 102 751.7, filed May 19, 2021, the entire contents of which are incorporated herein by reference.

TECHNICAL FIELD

The present invention pertains to a stacking device and to a stacking method as well as to a storage device and to a handling plant having the features described in the preamble of the independent claims.

BACKGROUND

Such a stacking device together with a stacking method is known from WO 2015/128452 A1. This discloses an individual stacking place for a stack of containers and a stationary handling device with a multi-axially movable handling unit for slip-on containers and for a respective layer of products accommodated therein.

The object of the present invention is to improve the stacking technology known at the priority date with regard to its possible uses as well as qualitatively.

The present invention accomplishes this object with the features disclosed.

SUMMARY

An The stacking technology being claimed, i.e., the stacking device, the stacking method, the storage device and the handling plant have various advantages.

The stacking technology being claimed is intended for products in the form of layers of products, wherein the stacking device is configured to load the layers of products each in a slip-on container, which is open at the bottom, and to store said layers of products with this slip-on container together in a stack of containers, and/or to transfer layers of products located in slip-on containers from a stack of containers and to unload the particular layer of products from the slip-on container. The stacking device has a handling device having a multi-axially movable handling unit for the slip-on container and, if applicable, for the layer of products accommodated in each of them. The handling unit is configured to handle the slip-on containers which are open at the bottom. The layers of products in the stack of containers are located on a container bottom of a lower slip-on container and are enclosed laterally and at the top thereof by an upper slip-on container arranged over the lower slip-on container. The lowermost layer of products in the stack of containers may be located on a mobile stack carrier.

The slip-on containers have a stackable configuration. They have a box-like shape with a side wall, with an end-face container bottom and with a large container opening at the other end face. The container opening has a size adapted to the format of the layer of products and may enclose a layers of products laterally. The side wall and the container bottom have a wall shape that is at least largely, preferably entirely closed. The slip-on container is handled by the handling device, especially by the handling unit in an upside-down position with the container opening pointing downwards. The slip-on container may be slipped on over a layer of products from above and may accommodate the product layer in its inner cavity. The handling unit is configured correspondingly for this purpose.

The stacking device comprises a row arrangement of a plurality of stacking places according to a first aspect of the present invention, wherein the handling device comprises a movable support, which is configured to move the handling unit along a first, facing side of the row arrangement. The stacking places are each used for the long-lasting or temporary accommodation of a stack of containers. The stacking places have in this respect the function of storage places.

The stacking technology is consequently expanded and qualitatively improved in its possible uses. The handling device may use the plurality of stacking places and a stack of containers located there. It may stack up or unstack or, if applicable, even restack the stack of containers in question at a stacking place. The stacking places are preferably arranged in a stationary manner. They may be mounted to the floor. The row arrangement may have a different orientation. The row arrangement may comprise a straight row and/or a curved row of stacking places. The support may be configured in a manner corresponding to the row geometry.

The stacking device may have one or more loading stations in the work area of the handling device for receiving and/or releasing a layer of products. The loading stations are arranged at a distance opposite said first side of the row arrangement and on the other side of the handling device. A driving aisle, in which the support may be moved with the handling unit, preferably in a reversing travel movement, is formed between the row arrangement and the one or more loading stations.

A multiple arrangement of loading stations has the advantage that the performance of the stacking device can be increased considerably. The stacking operations between the one or more loading stations and the plurality of stacking places may be overlapped with each other. It is possible, in addition, to transfer and to feed, if applicable, a stack of containers at a stacking place without interrupting the stacking operations.

The arrangement of a plurality of loading stations with an equal number and possibly with the same distribution as the stacking places in the row arrangement is advantageous. Consequently, the paths between the loading stations and the stacking places for moving a layer of products and a slip-on container are shortened. In particular, the direct transfer of a layer of products and, if applicable, of a slip-on container between the loading station and the opposite stacking place is possible.

The stacking device has a transporting aisle for a transport device, which is configured for receiving and for releasing a stack of containers at a stacking place, on another side of the row arrangement, which side is facing away. The layers of products may, as a result, be stored and be transferred to a different location on a first and preferably front side of the row arrangement in the stack of containers, wherein a stack of containers can be discharged and, if applicable, fed from the transport device on another, preferably opposite or rear side of the row arrangement.

In a preferred embodiment of the stacking technology, the stacks of containers are gradually assembled during the storage of the layers of products and are gradually taken down during the transfer of the layers of products. In addition, it is possible to carry out the storage and the transfer of layers of products within the framework of a restacking process as in WO 2015/128452 A1.

The gradual assembly and taking down or the stacking up and unstacking of a stack of containers preferably filled with layers of products, which is made possible by the stacking technology being claimed, has advantages as regards reduction of the design effort and costs as well as increase in the performance. The, e.g., temporary arrangement of a preferably mobile stack carrier at the stacking places is sufficient. A stack guide together with stack lifter provided during the restacking may be omitted. The gradual assembly and taking down of a stack of containers can be carried out faster than the restacking of a stack of containers, especially in conjunction with a buffering or temporary storage of empty slip-on containers or slip-containers filled with layers of products should be at the handling device.

The movable support for the handling unit may be configured in a different way. It may comprise a stationary support device and a drive carrier movable on it, wherein the handling unit is arranged in a stationary or movable manner, especially in a vertically adjustable manner, at the drive carrier. For this purpose, the drive carrier may have a suitable, upright lifting axis. The lifting axis may be formed in the handling unit in case of a stationary arrangement of the handling unit. The stationary support device may extend along the row arrangement and have a corresponding straight and/or curved geometry. The support device may be configured, e.g., as a guide located at the bottom or as a raised portal. The movable support for the handling unit may in another variant have an automatic conveying vehicle, e.g., an AGV (automated guide vehicle) which is bound to the floor and, e.g., rolls on the plant floor, which the conveying vehicle forms, e.g., the drive carrier or accommodates a drive carrier.

The handling device may have a supporting bottom that is carried along with the handling unit. The supporting bottom may be used for various purposes. It may be used, on the one hand, for the direct or indirect accommodation of a layer of products during the transport thereof between a loading station and a stacking place or a stack of containers located there. In addition, another object may be accommodated on the supporting bottom. This may be, e.g., an empty slip-on container or a mobile stack carrier.

The mobile stack carrier is intended to form the bottom of a stack of containers and form the stack of containers on the stack carrier. The configuration of the mobile stack carrier has an independent inventive importance, which will be discussed below.

The supporting bottom may be vertically adjustable synchronously or asynchronously with the handling unit. The supporting bottom may likewise be arranged at the support, and especially at the drive carrier thereof. The supporting bottom may be coupled with the handling unit for a synchronous lifting and lowering movement or may have a separate adjusting device for changing the vertical position.

If, e.g., a layer of products is accommodated directly on the supporting bottom for the transport and the displacement movement between a loading station and a stacking place, a synchronous vertical adjustment of the supporting bottom and the handling unit is recommended. In case of an indirect accommodation on the supporting bottom, a stack arrangement of one or more slip-on containers may be arranged between the layer of products and the surface of the supporting bottom. The outer side of the container bottom of the uppermost slip-on container may form a support surface for the accommodation, transport and displacement movement of a layer of products.

Such a stack arrangement of slip-on containers on the supporting bottom may save travel paths of the handling unit along the driving aisle for receiving and releasing empty slip-on containers and may increase the performance of the stacking device. This is advantageous especially during the gradual stacking up and unstacking of stacks of containers consisting of slip-on containers with layers of products accommodated therein. The empty slip-on containers accumulating during the gradual unstacking and transferring of the layer of products may be temporarily accommodated in the stack arrangement. They are then directly available again during the gradual stacking up of a stack of containers and during the storage of the layers of products.

The handling device may have in the work area of the handling unit at least one temporary storage unit for slip-on containers, which are empty and/or filled with a layer of products. The temporary storage unit may be arranged at the movable support and be carried along by the movable handling unit. The temporary storage unit may have a rigid or vertically adjustable storage unit bottom that is configured for accommodating an individual slip-on container or an intermediate stack from a plurality of slip-on containers. The temporary storage unit, especially the storage unit bottom, may be arranged, e.g., at the drive carrier of the movable support. The handling unit may be configured to move a slip-on container to the temporary storage unit and back as well as to stack up and/or to unstack slip-on containers at the temporary storage unit, if applicable. The handling unit may have for this purpose a correspondingly expanded kinematics, e.g., in the form of an industrial robot, or an auxiliary device, e.g., a pusher.

The temporary storage unit may be arranged, e.g., next to the supporting bottom and may preferably be vertically adjustable independently from the supporting bottom. The temporary storage unit, and especially the storage unit bottom or an upper container bottom, may in this case be brought to the same height as the supporting bottom. As a result, an empty or full slip-on container can be moved by displacement from the supporting bottom to the temporary storage unit and back.

The temporary storage unit is likewise advantageous for the gradual stacking up and unstacking of stacks of containers consisting of slip-on containers with layers of products accommodated therein. The temporary storage unit may temporarily store empty slip-on containers and may, as a result, save travel paths of the handling unit along the driving aisle for receiving and releasing empty slip-on containers and increase the performance of the stacking device. In addition, the temporary storage unit may completely or partially accommodate a stack of containers with stored layers of products. This is likewise advantageous for saving travel paths of the handling unit along the driving aisle, when the stacking place and the loading station are arranged offset to one another along the driving aisle and/or when the number of stacking places and loading stations involved is at different levels. In addition, the temporary storage unit makes it possible to keep the supporting bottom free for the displacement process of the layers of products during storage and transfer. The supporting bottom does not then need to accommodate any stack arrangement of slip-on containers.

The slip-on containers have each a box-like shape with a side container wall and with a container bottom on the one end face as well as with a container opening on the other end face. The container opening is adapted to the geometry of the layer of products and can enclose a layer of products. The handling unit may be configured to hold and handle such a slip-on container in a position pointing downwards with the container opening. The handling unit can carry out a lifting and lowering movement during the handling with the slip-on container. In this case, the handling unit can place the slip-on container over a layer of products or can remove the slip-on container from a layer of products. The handling unit may perform a lifting and lowering movement during the handling with the slip-on container. The placing on and the removal of the slip-on container can thus be achieved. The handling unit may be configured to move the slip-on container laterally and transversely to a stacking place, especially transversely to the row arrangement, during the handling. As a result, the handling unit can move the slip-on container between a loading station and a stacking place beyond the driving aisle. This may be a movement with horizontal and vertical movement components.

The handling unit can further be configured to move the slip-on container together with a layer of products accommodated in the slip-on contained during the handling laterally and transversely to a stacking place in said manner. The layer of products may, as a result, be pushed back and forth between a loading station and a stacking place or a stack of containers located there. The pushing movement may be a horizontal component and even a vertical direction component. The supporting bottom and, if applicable, a stack arrangement located on it, can be included in the pushing movement.

The handling unit may have a handling tool for holding a slip-on container in a detachable manner and a preferably movable tool guide for the handling tool. The handling tool is configured to hold the slip-on container in the downwards open position. The movable tool guide may be formed, e.g., by a pivotable or telescopic extension arm with a guiding function for the handling tool. A handling tool may be configured, e.g., as a gripper, which mechanically holds and moves along a slip-on container with a clamping connection and/or positive locking and/or in another manner, e.g., with suction force. The movable tool guide makes it possible to move the handling tool laterally against the support, especially laterally against the driving aisle, and in an area above a loading station and below a stacking place, and especially a stack of containers located there or a mobile stack carrier located there. The movable tool guide also makes it possible to reduce the interfering contour for a movement of the handling unit along the driving aisle and the row arrangement of the stacking places.

According to a second and independent aspect of the present invention of the stacking device, the handling device may comprise a layer holder which has a holding function for the layer of products. The layer holder may be associated, e.g., with the handling unit. As an alternative, the layer holder may be associated with a loading station.

The layer holder may be configured to hold and align a layer of products separated from the slip-on container in at least some areas. The slip-on container may for this purpose be raised, e.g., a little from the layer of products, so that the layer holder is able to laterally access the layer of products and may grip, hold and align the layer of products. The slip-on container may in this case also overlap the upper part of the layer of products, so that the products located in the layer of products can be prevented from falling over. The layer holder may have one or more movable centering units and a holder actuator. The holding function of the layer holder may bring about a securing of the position and location of the products within a layer of products and may stabilize, e.g., unstable products in their upright position.

The layer holder may be further configured to displace a layer of products, which is separated from the slip-on container in at least some areas, between a stacking place, the supporting bottom and a loading station and in the process to guide the layer of products. The independent guiding and the displacement of the layer of products by the layer holder have advantages for securing the location and position of the products within the layer of products. Undesirable changes in position, e.g., a rotation of products about their vertical axis or a tilting of products can especially be prevented. In this connection, the slip-on container may be exempt from a displacement function for the layer of products. This guiding and displacement function of the layer holder may be advantageous both during the storage of a layer of products in the stack of containers and during the transfer of the layer of products and during the release of the layer of products at a loading station. The guided and defined supply of a layer of products at a loading station for discharge and, if applicable, separation of the layer of products may in this case be especially important and advantageous.

The layer holder may be associated, e.g., with the handling unit in the manner mentioned above. It may be located, e.g., at the handling tool and may laterally grip and hold the layer of products that is released in at least some areas, after a raising of the downwards open slip-on container. The layer holder may, as an alternative, be associated with the handling device in a different manner and may have a separate kinematics. It may be associated, e.g., with the support. The layer actuator may, in this case, both move the one or more centering units for holding and aligning the layer of products and may bring about the displacement movement of the held layer of products as needed.

In another variant, a layer holder may be associated with another station, e.g., with a loading station. In such a case, the handling unit with the upside-down slip-on container and with the layer of products accommodated therein may carry out the displacement movement of the layer of products for storing and transferring. The layer holder at the loading station may then independently bring about a holding and guiding as well as aligning of the layer of products during the picking up and/or during the release at the loading station.

The layer holder being claimed has said independent inventive importance. It expands the use area of the stacking device and improves the quality thereof in terms of securing the position and secured guiding of the layer of products and the products contained therein. The layer holder may be used especially advantageously for the claimed stacking device with the above-mentioned first aspect of the present invention and with the plurality of stacking places in a row arrangement as well as with the movable support. The layer holder according to the present invention may, however, also advantageously be used together with another stacking device that comprises the features mentioned in the preamble of claim 1 and comprises the, e.g., only one stacking place and a handling device arranged in a stationary manner. The layer holder according to the present invention may be used advantageously, e.g., on a stacking device according to WO 2015/128452 A1 or on another stacking device with said slip-on containers, which are upside down and directed downwards with the container opening enclosing the layers.

The stacking device may have a positioning device for mutual positioning of a stack of containers and of the handling device at a stacking place. Consequently, a displacement operation of the layer of products and of the slip-on container can be carried out reliably, rapidly and without delay. The positioning device may be configured in a different manner. It may have, e.g., a positioning unit at a stacking place for the precise positioning of the stack of containers and especially of the mobile container carrier. As a result, the handling unit, which is movable along the driving aisle, can approach the stacking position in an accurate and precise manner. The mobile stack carrier may be adapted to such a positioning unit. The positioning device may also secure the position of the mobile stack carrier and of the stack of containers at the stacking place. In this case, a receiving and removal of the stack of containers may, nevertheless, be possible at the stacking place due to a transport device.

The stacking device may have a supply unit for one or more mobile stack carriers and/or a supply unit for one or more empty slip-on containers in the work area of the handling device. The supply unit(s) permit a stocking and buffering of mobile stack carriers and/or empty slip-on containers.

The handling device may first receive a mobile stack carrier and then empty slip-on containers, e.g., for the gradual assembly of a stack of containers at a stacking place and use same for storing a layer of products. The mobile stack carrier and the empty slip-on containers may be accommodated on the supporting bottom individually or in said stacking arrangement or from the carried-along temporary storage unit. During, e.g., the gradual taking down of a stack of containers, the handling device may temporarily accommodate the slip-on containers emptied from the respective layer of products on the supporting bottom or in the carried-along temporary storage unit and buffer same in a stack arrangement or in an intermediate stack. The handling device may return and release there the emptied slip-on containers individually or collectively in the form of the stack arrangement or of the intermediate stack as well as the mobile stack carrier to the respective supply unit. They may be stocked there for assembly of the next stack of containers. They may, as an alternative, be removed by the transport device or in another manner, as needed, from the supply unit or also be fed to same again.

The stacking device may comprise a transport device for a stack of containers. Multiple transport devices may be present. The transport device may be configured as an automatic transport device. The transport device is preferably configured as a self-steering and driver-less as well as preferably floor-mounted transport vehicle, e.g., a so-called AGV or FTF. The transport device may have a transport loader and, if needed, a lifting device for the transport loader. The transport loader may be configured, e.g., as a retractable and extendable loading fork.

The stacking device may have at least one said mobile stack carrier. The mobile stack carrier has a carrier top, a carrier bottom and a transport receiver. The carrier top may be configured to receive a downwards open slip-on container and, if applicable, a layer of products contained therein. The slip-on container may be received in a guided manner and be brought into a defined position at the mobile stack carrier and held in the position as a result. The guide may be configured, e.g., as a mechanical and positive-locking catch mechanism. Such a catch mechanism may be configured between the side wall and the container bottom of the respective slip-on containers as well.

The carrier bottom of the stack carrier may be configured to form a defined supporting surface for the stack carrier. In addition, the carrier bottom may be adapted to a positioning device and/or to a top of a slip-on container, wherein a respective guiding function is formed. The adaptation to the positioning device makes it possible to position the mobile stack carrier precisely and with guided contact with a positioning unit at a stacking place. The adaptation to a top of a slip-on container, which is upside down in the stack of containers and is pointing downwards with said container opening makes it possible to stack a plurality of smaller and individual stacks of containers on top of each other. In this connection, a mobile stack carrier is located between the respective stacks of containers. The assembly and taking down of such multi-part stacks of containers may be carried out by means of said transport device. The transport receiver may be intended and configured to make possible a defined contact with the transport loader, e.g., with a loading fork, of a transport device. A transport receiver may be configured, e.g., as a defined insertion opening with support devices on a side wall of the mobile stack carrier. As an alternative, other configurations of the transport receiver, e.g., in the form of projections, coupling units or the like are possible.

The present invention also pertains to a storage device for stacks of containers consisting of said upside-down slip-on containers. The storage device may have the above-described stacking device and other components, e.g., a stack storage area for a plurality of stacks of containers.

The present invention also pertains to a handling plant for products, especially empty or full bottles, wherein the handling plant comprises a stacking device for the products in the form of layers of products. The stacking device is configured in the manner claimed. The handling plant may further comprise a product feed device that is connected to a loading station of the stacking device and/or a product discharge device that is connected to a loading station of the stacking device. Multiple said product feed devices and product discharge devices may be present corresponding to the number of the loading stations. A product feed device may have a layer-forming device, which forms a layer of products from one or more rows of products fed in and supplies same to said loading station. A product discharge device may comprise a row-forming device, which separates the layer of products supplied to the loading station and forms one or more rows of products that can then be transported away with corresponding conveying technology.

The handling plant may comprise a product delivery unit which is arranged upstream of the stacking device and a product handling device which is arranged downstream of the stacking device. A product delivery unit may be configured, e.g., as an unpacker or as a product-producing device, and especially a bottle-producing device. A product handling device may be configured, e.g., as a filling plant. The product delivery unit and the product handling device may be connected to said loading stations.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 1, 2, 3, and 4 are a process in case of the gripping and stacking of a layer of products with slip-on containers in various partial steps.

DESCRIPTION OF PREFERRED EMBODIMENTS

Figure 5:
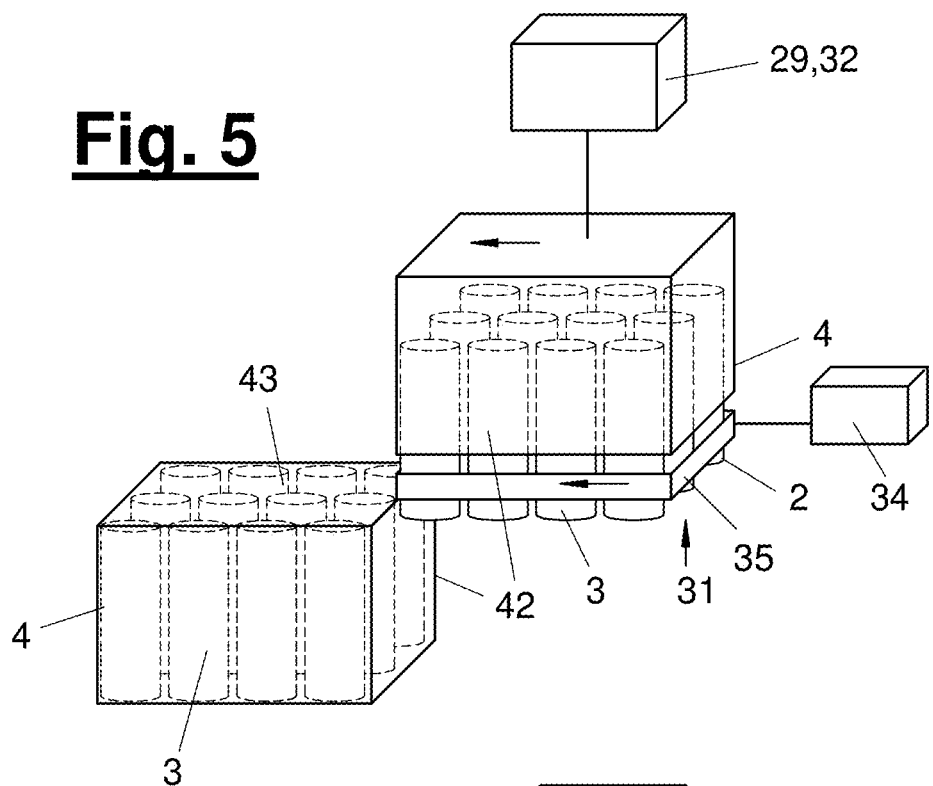
FIGS. 5 and 6 are two variants of the process with a layer holder.

Referring to the drawings, The present invention pertains to a stacking device (7) and to a stacking method for layers of products (3). Further, it pertains to a storage device (8) and to a handling plant (1) as well as to a mobile stack carrier (6).

The layer of products (3) may be formed by one or more products (2). The products (2) may be arranged in a flat or matrix-like arrangement next to each other and possibly also above each other. In the preferred exemplary embodiments shown, the products (2) consist of empty or full bottles or other containers. As an alternative, other forms of products, e.g., packages or the like are possible. Empty and lightweight bottles made of plastic are used in the exemplary embodiments being shown. Such bottles may have an unstable position when standing.

In the exemplary embodiments shown, the products (2) stand next to one another within the layer of products (3). In this case, they may stand in a regular matrix, which is formed by a plurality of rows of products which are arranged next to one another and have the same orientation. A row offset and a nesting of the individual products (2) in adjacent rows are also possible in another embodiment.

FIGS. 1 through 4 show a stack-forming operation in a plurality of steps. The stack is formed by means of slip-on containers (4), which have a container side wall (42), a downwards directed, end-face container opening (44) and an upwards directed container bottom (43) at the other, opposite end face. The container opening (44) is large and has a size adapted to the layer format and to the outline of a layer of products (3). The slip-on containers (4) may have the form of upside-down boxes or trays. They may be pulled over a layer of products (3) with their lower container opening (44). Consequently, they accommodate the layer of products (3) in their hollow interior, wherein the layer of products (3) is otherwise supported from the bottom.

The slip-on container (4) may have, e.g., a cubic shape and have any desired format, e.g., a format corresponding to a Euro pallet. It may consist of any desired material, especially plastic, metal or wood or even composite materials. The format of the container interior is preferably adapted to the product layer format in size and shape and is slightly larger.

The container side wall (42) encloses the layer of products (3) on their sides in the inverted position. In this case, side container wall preferably encloses layer of products on all sides and offers a lateral guide for the layer of products (3), as a result. The, e.g., four side walls of the container wall (42) are connected rigidly to one another and preferably also to the container bottom (43) in the exemplary embodiments being shown. The side walls form thereby a kind of framework for the layer of products (3). In the exemplary embodiments being shown, the walls of the container side wall (42) have a flat shape and have a solid configuration. They may have interruptions, e.g., a perforation, a grid or the like in another variant. They may also be formed by individual, spaced-apart struts, e.g., in conjunction with corner structures. Other suitable wall configurations are, in addition, possible. In the exemplary embodiments being shown, the container wall (42) has a rigid configuration and may not be deformed or only insignificantly. In another embodiment, it may have a greater flexibility.

The height of the container side wall (42) is preferably at least equal to or greater than the height of the layer of products (3). As a result, the slip-on containers (4) may entirely accommodate a layer of products (3) in their interior enclosed by the container side wall (42) and by the container bottom (43).

The container bottom (43) has multiple functions. On the one hand, it covers the layer of products (3) accommodated in the container interior upwards. On the other hand, the container bottom (43) forms with its outer side a supporting surface for the next higher layer of products (3) in the next higher slip-on container (4). The top of the container bottom (43) and the supporting surface that is formed hereby may have an essentially flat configuration.

The container bottom (43) preferably has a closed and stable wall. As an alternative, it may have openings, in which case it is configured at least as a grid bottom or a perforated bottom. The essentially flat surface shape makes it possible to displace the layer of products (3) and its products (2) on the outer side of the container bottom (43) and along the supporting surface.

FIG. 1 shows a first lower layer of products (3) in a slip-on container (4) and a second layer of products (3), which is arranged and provided at a slight distance above the first layer. According to FIG. 2, the slip-on container (4) is placed over this second layer of products (3), and is especially slipped over from above. The loose slip-on container (4) is in this case held in a floating position, wherein the lower opening-side edge of its container side wall (42) ends above the bottom of the layer of products (3). In this position according to FIGS. 2 and 3, the upper slip-on container (4) may then be displaced laterally, especially horizontally, in which case it picks up the layer of products (3) and as a result pushes it over the lower slip-on container (4) and puts it down on the carrier bottom (40) thereof. During the displacement movement, the upper layer of products (3) is supported from the bottom with a supporting bottom (30), not shown, on which the layer of products (3) can slide or slip during a lateral displacement.

On the other hand, it is possible in an embodiment, not shown, that a single, empty slip-on container (4) or a stack arrangement of empty slip-on containers (4) is arranged on the supporting bottom (30) and said layer of products (3) is supported during its displacement movement on the outer side of the upper container bottom (43) thereof.

At the end of the lateral pushing operation according to FIG. 3, the upper slip-on container still floats at a distance above the lower slip-on container (4). In the last step according to FIG. 4, the upper slip-on container (4) is lowered and put down onto the lower slip-on container (4). In this case, the container side wall (42) comes into contact with the container bottom (43) of the lower slip-on container (4) and is supported on it. In this position, the interior or receiving space with the accommodated layer of products (3) is closed all around on all sides.

In order to secure the mutual position of the slip-on containers (4) stacked on each other in the stack of containers (5) a mutual and preferably positive-locking guide of the slip-on containers (4) may be present in the contact area. This guide may be configured, e.g., as a mutual, positive-locking catch mechanism (45). The catch mechanism (45) may be configured in any desired, suitable manner. In one variant, the container bottom (43) has on its outer side one or more local or possibly all-around, step-like recesses, which accommodate the opening-side edge of the container side wall (42) of the upper slip-on container (4) in a positive-locking manner, center same and secure it laterally against slipping. In another variant, the edges of the container side wall (42) may likewise have a step-like configuration. In addition, any desired, other variants, especially also enmeshed pins and ribs and corresponding receiving openings are possible.

Figure 6:
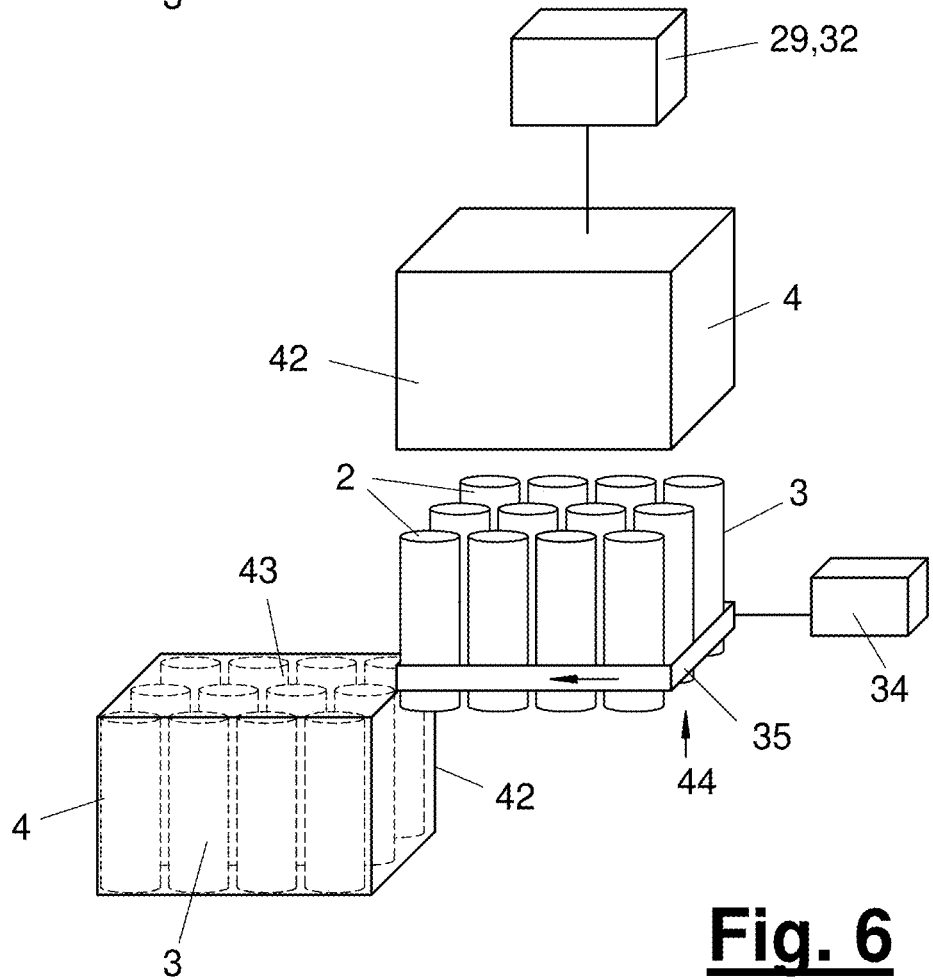

FIGS. 5 and 6 show two variants of a stack-forming operation and a displacement of the layer of products (3). A layer holder (31), which holds and aligns the layer of products (3), is used in both cases. The layer holder (31) has for this purpose one or more centering units (35) and a holder actuator (34) for the actuation thereof. In both cases, the slip-on container (4) is raised a little, as a result of which a lateral access to the layer of products (3) is allowed for the layer holder (31). In the embodiment of FIG. 5, the slip-on container (4) in this case still overlaps the upper area of the layer of products (3) and encloses same in this area laterally. In the variant of FIG. 6, the slip-on container (4) is picked up and removed entirely from the layer of products (3).

The layer of products (3) is displaced by means of the layer holder (31) in both cases. In the variant of FIG. 5, the layer holder (31) with the layer of products (3) and the slip-on container (4) are in this case moved synchronously in the displacement movement. In the variant of FIG. 6, the slip-on container (4) with the layer of products (3) can likewise be moved along, which does not have to take place synchronously, however.

The slip-on container (4) is primarily used for storing and accommodating a layer of products (3) in its container interior and for forming the stack of containers (5) in both variants of FIGS. 5 and 6.

Figure 7:
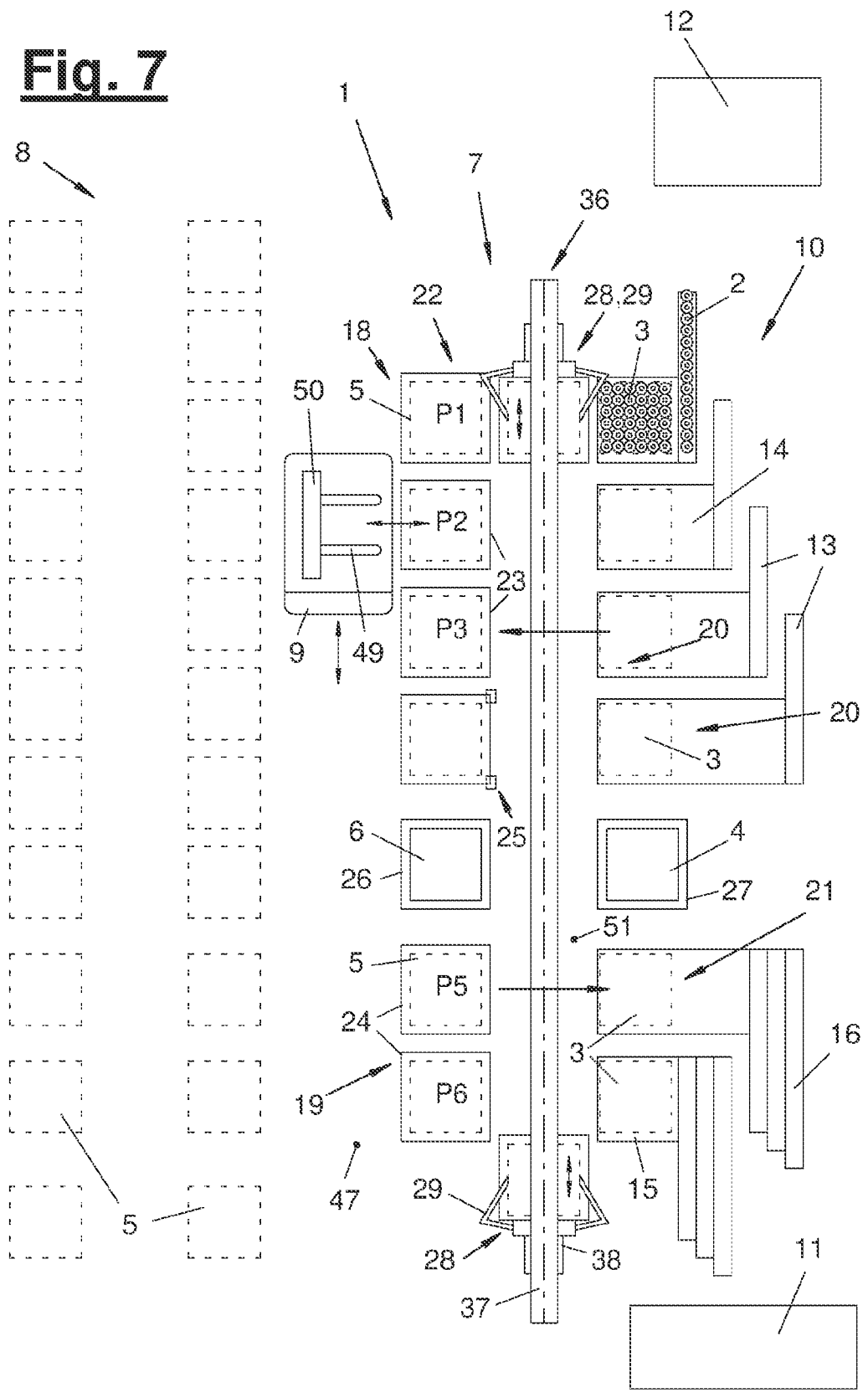
FIG. 7 is a top view of a handling plant and a stacking device.
Figure 8:
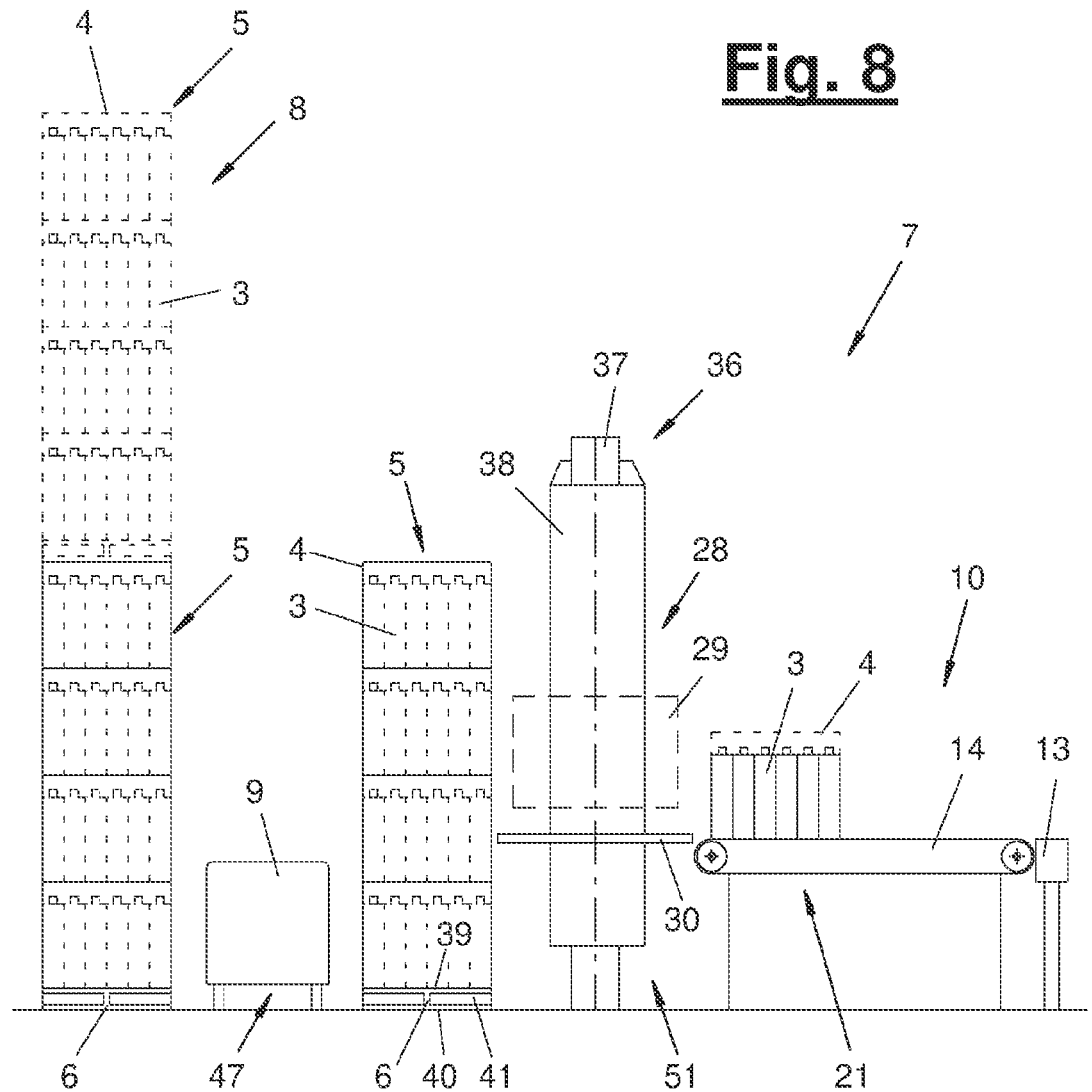
FIG. 8 is a front view of a handling plant and a stacking device.
Figure 9:
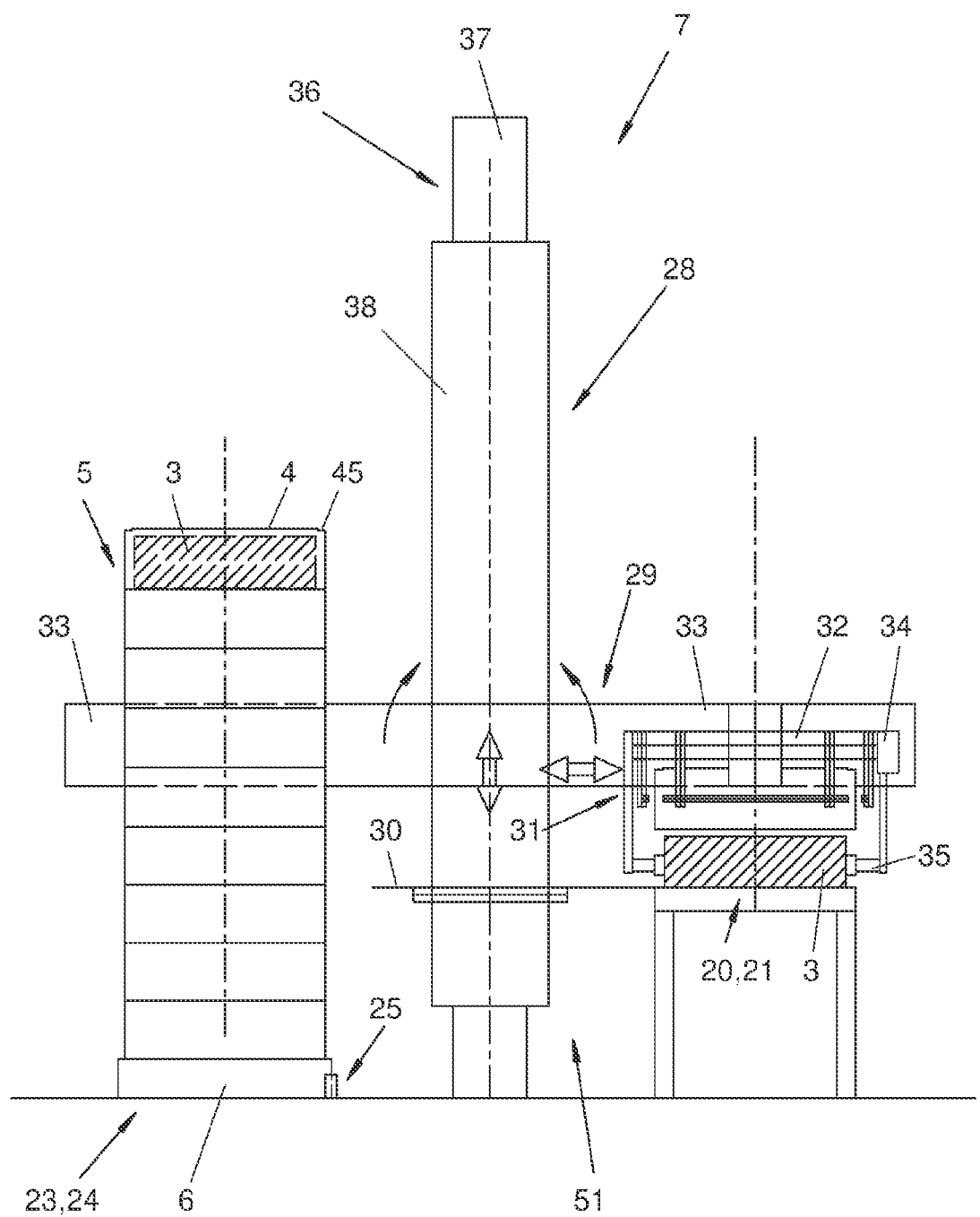
FIG. 9 is an exemplary embodiment of a handling device of the stacking device.

FIGS. 7 through 9 illustrate an embodiment of a stacking device (7), a storage device (8) and a handling plant (1).

The stacking device (7) is used to load layers of products (3) each in the one slip-on container (4) that is open at the bottom and to store the layers of products with the respective slip-on container (4) in a stack of containers (5). As an alternative or in addition, the stacking device (7) may be used to transfer layers of products (3), which are located in slip-on containers (4), from a stack of containers (5) and to unload the respective layer of products (3) from the slip-on container (4).

The stacking device has a handling device (28) with a multi-axially movable handling unit (29) for handling and moving the slip-on containers (4) and, if applicable, the respective layer of products (3) accommodated therein. The stacking device (7) further has a row arrangement (22) of a plurality of stacking places (23, 24). The row arrangement has a linear orientation in FIG. 7. As an alternative or in addition, a curved orientation is possible. The handling device (28) comprises a movable support (36), with which the handling unit (29) can be moved along a first side of the row arrangement (22), which side faces the handling unit (29).

The stacking device (7) further has one or more loading stations (20, 21) for receiving and/or for releasing a layer of products (3) in the work area of the handling device (28). The one or more loading stations (20, 21) are arranged at a distance opposite said first side of the row arrangement (22). A driving aisle (51), in which the handling unit (29) can be moved forwards and backwards by the support (36) along the row arrangement (22), is formed between the loading station or loading stations (20, 21) and the row arrangement (22). One or more loading stations (20) may be provided, e.g., for supplying and loading or storing a layer of products (3).

One or more loading stations (21) may be provided, e.g., for releasing and unloading or transferring a layer of products (3).

A transporting aisle (47) for a transport device (9), which can travel along the row arrangement (22) through the transporting aisle (47) and has access to the stacking places (23, 24), is arranged on the opposite side of the row-arrangement (22), which side is facing away. The transport device (9) is configured, e.g., as an automatic transport vehicle, which is self-steering and travels on the subfloor or the hall floor. Multiple transport devices may be present. The transport device (9) has a transport loader (49), which is configured, e.g., as a loading fork for receiving and for releasing a stack of containers. The transport loader (49) may be connected to a lifting device (50), which makes it possible to lift the transport loader (49) together with the received stack of containers (5). The transport device (9) may consequently place, e.g., a plurality of stacks of containers (5) above one another. This is possible and intended, e.g., in a storage area (8). In the storage area (8), the stacks of containers (5) are put down on suitable storage places, wherein corresponding aisles are present for access to the transport device (9).

In the exemplary embodiments shown, the stacking device (7) is configured to preferably gradually stack up and unstack a stack of containers (5) at the stacking places (23, 24). The stacking places (23, 24) may in this case be separated from one another in space. In the embodiment being shown, a stacking-up area (18) and an unstacking area (19) are arranged spatially and functionally separated from one another. The two areas (18, 19) may, as an alternative, be combined. In the stacking-up area (18), stacks of containers (5) are gradually assembled or stacked up at the stacking places (23) and layers of products (3) are stored in the process. Upon completion of a stack of containers (5), this stack of containers may be picked up by the transport device (9) and transported into the storage area (8).

A respective stack of containers (5) is gradually taken down or unstacked at the unstacking area (19) and the layers of products (3) are transferred in the process to the stacking places (24). If a stacking place (24) is empty, a new stack of containers (5) with stored layers of products (3) is delivered by the transport device (9).

The handling unit (29) is used for handling the slip-on containers (4), which are open at the bottom, and is configured correspondingly for this. For this purpose, FIG. 9 shows a structural exemplary embodiment, which will be explained below.

The support (36) has a stationary support device (37) and at least one drive carrier (38) movable on it. The stationary support device (37) is configured, e.g., in FIGS. 7 through 9 as a raised portal, at which at least one drive carrier (38) is movably mounted in a suspended manner and by means of a chassis and is movable in a controlled manner by means of a suitable drive. The stationary support device (37) extends along the row arrangement (22). In the embodiment being shown, the handling unit (29) is arranged in a vertically adjustable manner at the drive carrier (38), which has for this a suitable, upright lifting axis, which is configured, e.g., as an upright carriage guide with a carriage drive.

In addition, the handling device (28) comprises a support bottom (30), which is guided along with the handling unit (29). In the exemplary embodiment shown, this supporting bottom is vertically adjustable synchronously with the handling unit and may be arranged, e.g., together with the handling unit on the lifting axis of the drive carrier (38). The supporting bottom (30) is used for the preferably direct reception and support of a layer of products (3) during the pushing movement between a loading station (20, 21) and a stacking place (23, 24) as well as in the opposite direction. The layer of products (3) slides in this case over the supporting bottom (30) and is supported on this supporting bottom. In this case, the supporting bottom (30) is positioned together with the handling unit (29) in a suitable vertical position at the loading station (20, 21) and at the respective stacking place (23, 24). Depending on the height of the stack of containers (45), the vertical position in this case can be changed for pushing over the layer of products (3) onto and from the stack of containers (5).

The handling unit (29) may hold and handle as well as move a respective downwards open slip-on container (4) in the manner mentioned. The handling unit may in this case perform a lifting and lowering motion with the slip-on container and in the process place the slip-on container (4) over a layer of products (3) or put on and remove the slip-on container from a layer of products. The putting on and removal may take place at a loading station (20, 21) for receiving or releasing a layer of products (3) during storage or transfer.

The handling unit (29) may, in addition, move the slip-on container (4) laterally and transversely to a stacking place (23, 24) as well as to a loading station (20, 21) as well as transversely beyond the driving aisle (51). The handling unit (29) has for this a corresponding, possible extension arm to the left and to the right up to above a loading station (20, 21) and above a stacking place (23, 24).

Returning to FIGS. 1 through 6, the handling unit (29) in the variant from FIGS. 1 through 4 may move and displace the slip-on container (4) together with a layer of products (3) accommodated there laterally and transversely to the row arrangement (22). The slip-on container (4) moved by the handling unit (29) takes along the enclosed layer of products (3) in this case during its movement. The layer of products (3) is in the process displaced in said manner between a stacking place (23, 24), the supporting bottom (30) and a loading station (20, 21).

As FIG. 9 illustrates, the handling unit (29) has a handling tool (32) for the detachable holding of a slip-on container (4) and a preferably movable tool guide (33) for the handling tool (32). The handling tool (32) is configured, e.g., as a controllable gripper, which is preferably able to grip a slip-on container (4) in a positive-locking manner and which can perform in this case a lifting and lowering motion, on the one hand, and, on the other hand, a driving and displacing motion along the tool guide (33), which is oriented transversely to the driving aisle (51). In the extended position, the movable tool guide (33) extends beyond a stacking place (23, 24) and a loading station (20, 21). The tool guide (33) can be moved into a position with a reduced interfering contour for the vehicle operation along the driving aisle (51). The tool guide (33) may have a pivotable configuration for this, e.g., in the manner suggested in FIG. 9 or may, as an alternative, be telescopic.

Moreover, FIG. 9 illustrates the use of a layer holder (31) according to FIGS. 5 and 6. The layer holder (31) in the exemplary embodiment shown is associated with the handling unit (29). The one or more movable centering units (35) and the controllable holder actuator (34) are arranged for this purpose, e.g., at the handling tool (32). They may be lowered and fed to the layer of products (3), for example, after lifting the slip-on container (4) from an inoperative position. The layer holder (31) may be taken along and moved along during the lateral traveling and displacement movement of the handling tool (32).

A layer holder (31) may be independently arranged in a movable manner at the support (6) in another embodiment, not shown. The holder actuator (34) may be configured for this and an auxiliary function for the independent carrying out of a displacement movement from a stacking place (23, 24) over the supporting bottom (30) to a loading station (20, 21) and in the opposite direction.

In these embodiments, the layer holder (31) is associated with the handling device (28). In another embodiment, not shown, a layer holder (31) may be arranged in a stationary manner at a respective loading station (20, 21). The layer holder (31) may in this case hold and align a respective layer of products to be received or to be released at the loading station (20, 21). Such a layer holder (31) does not have to carry out a displacement movement, but can do this, as an alternative.

In all said cases, the layer of products (3) is positioned at a loading station (20, 21) in a defined and reproducible manner thanks to the layer holder (31).

As FIG. 7 illustrates, the stacking device (7) has, in the work area of the handling device (28), a supply unit (27) for one or more empty slip-on containers (4) and, in addition, a supply unit (26) for one or more mobile stack carriers (6). The supply unit(s) (26, 27) are arranged, e.g., in a stationary manner and at the bottom of the handling plant (1). The slip-on containers (4) and/or stack carriers (6) may be received in the form of stacks at the supply unit (26, 27) in question.

The stack carriers (6) and the empty slip-on containers (4) may be received with the handling unit (29) at the supply unit(s) (26, 27) as well as be released there and may be transported back and forth between the supply units (26, 27) and the stacking places (23, 24). They may be put down on the supporting bottom (30) in this case.

The stacking device (7) has a positioning device (25) for mutual positioning of a stack of containers (5) and of the handling device (28) at a stacking place (23, 24) and, if applicable, also at a loading station (20, 21). The positioning device (25) is configured, e.g., as positive-locking stops from bottom-side positioning units for a stack of containers (5), especially of its mobile stack carrier (6). The positioning units may be configured, e.g., as positive-locking stops, which are arranged in a rigid or movable manner and, if applicable, can be fed against a restoring force. FIG. 9 shows such an embodiment as an example.

The stacking device (7) has a plurality of mobile stack carriers (6) for a stack of containers (5) each. The stack carriers (6) are put down and positioned by the handling device (28) at a stacking place (23, 24). They form the bottom of the stack of containers (5) to be set upright thereon. They also form the supporting surface for the lowermost layer of products (3) in the stack of containers (5). The mobile stack carriers (6) have at the top a carrier top (39), a carrier bottom (40) at the bottom and, in addition, a transport receiver (41). The latter is coordinated with the transport loader (49) of the transport device (9). The carrier top (39) receives a layer of products (3) and the lowermost piece slip-on container (4). The piece container (4), which is open at the bottom, is in this case received in a guided manner, e.g., by means of a catch mechanism (45).

The carrier bottom (40) may have multiple functions. It forms a defined supporting surface for the stack carrier (6)

and the stack of containers (5) set upright thereon on the subfloor or hall floor and at the stacking place (23, 24), on the one hand. The carrier bottom (40) may, on the other hand, be adapted to a positioning device (25) and/or to a top of a piece container (4). In these cases, e.g., a positive-locking guide function may be present. A stack carrier (6) can be arranged between the adjacent stacks of containers (5) when a plurality of stacks of containers (5) are stacked on top of each other.

FIG. 7 shows the embodiment of a handling plant (1). This handling plant comprises at least one stacking device (7) of the above-described type. In addition, a storage device (8) is present, which has a stack storage area (48) for a variety of stacks of containers (5), which are arranged next to one another and preferably put down at the bottom, in addition to aisles.

The handling plant (1) further comprises a product delivery unit (12) which is configured, e.g., as an unloader for products (2) or as a product-producing device, e.g., as a blow molder for plastic bottles. The product delivery unit (12) is arranged upstream of the stacking device (7) and is connected to one or more loading stations (20, 21).

The handling plant (1) may further have a product handling device (17). This is, e.g., a filling plant for the filling of empty bottles (2). The product handling device (17) is arranged downstream of a stacking device (7) and is connected, e.g., to one or more loading stations (21).

Furthermore, the handling plant (1) has at least one product feed device (10) connected to a loading station (20) and a product discharge device (11) connected to a preferably other loading station (21). The product feed device (10) is connected, e.g., to the product delivery unit (12). The product feed devices (10), of which there are, e.g., multiple devices, have each a layer-forming device (14) at a loading station (20) and a feed conveyor (13) connected here for one or more rows of bottles. The layer-forming device (14) receives a respective partial row from the fed row of bottles and conveys the partial row by means of a conveyor belt or the like in the direction towards the loading station (2), whereby a layer (3) is formed by the lining up of these partial rows.

The product feed device (11) which is present as a single device or multiple devices has a respective row-forming device (14) and a single-stranded or multi-stranded discharge conveyor (16). The row-forming device (14) separates the layer of products (3) put down during the transfer and forms from this one or more rows of bottles, which are fed to the product handling device (17).

Figure 10:
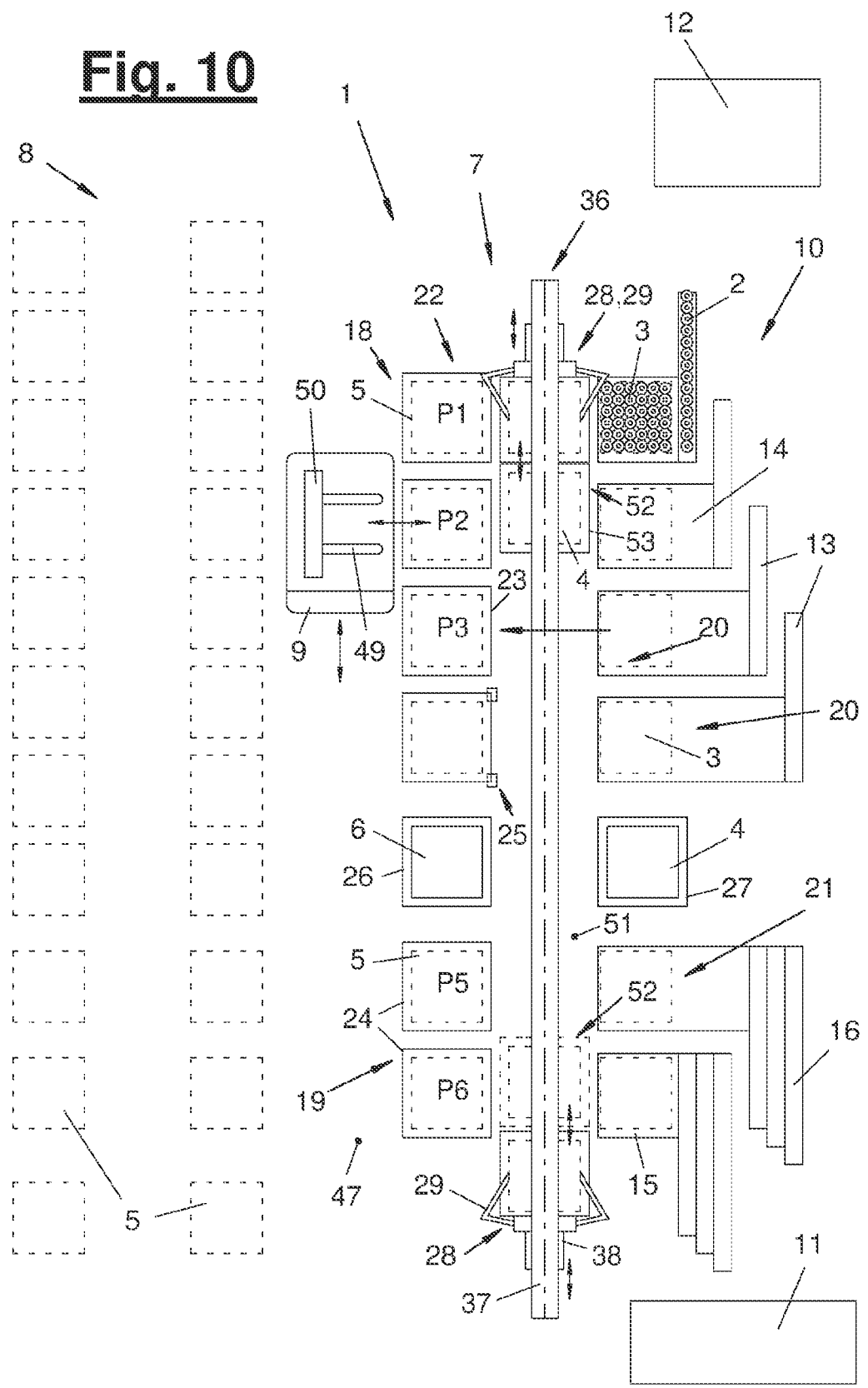
FIG. 10 is a top view of a variant of the handling plant and the stacking device with a temporary storage unit.
Figure 11:
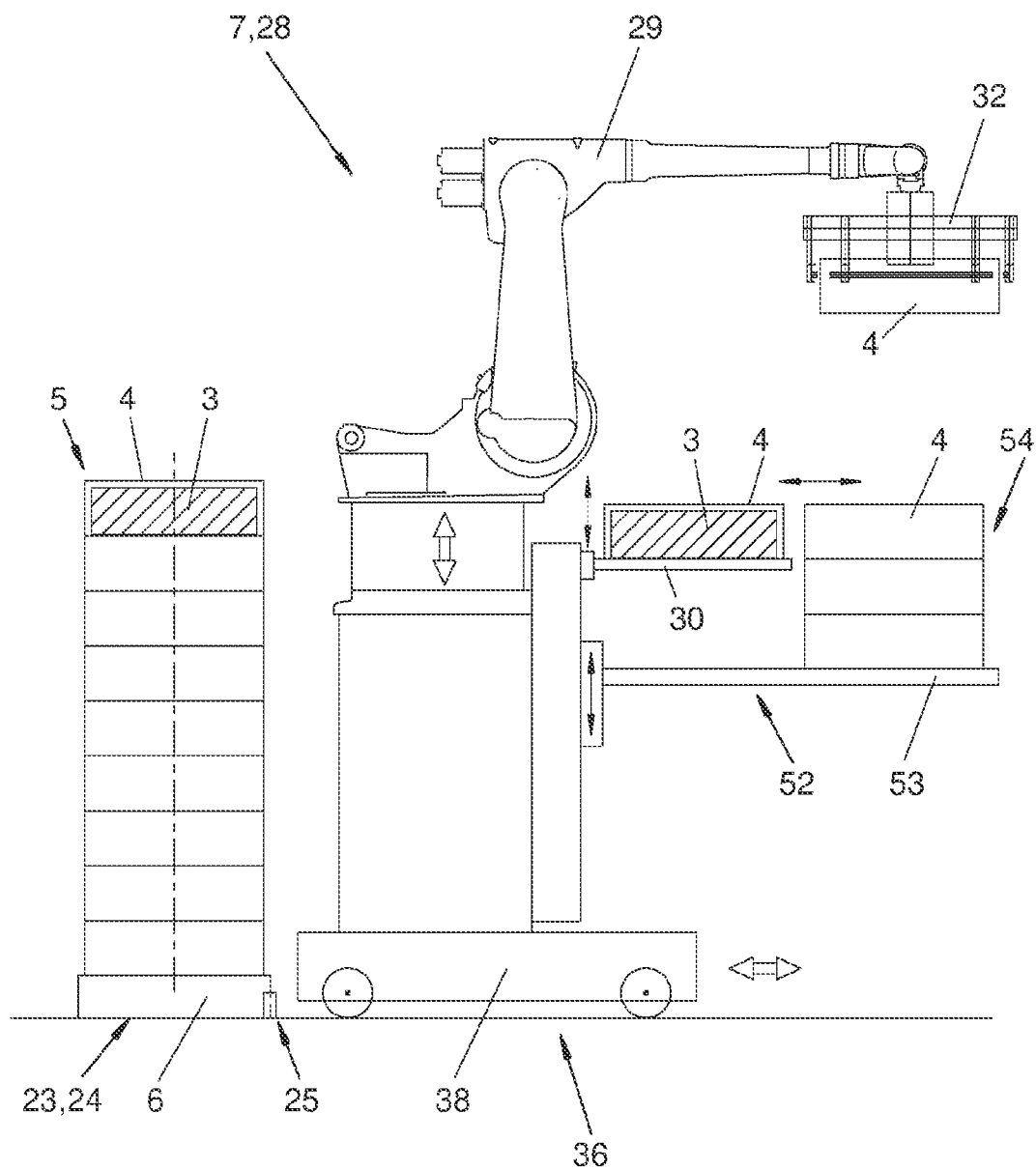
FIG. 11 is a side view of the stacking device from FIG. 10.

FIGS. 10 and 11 show a variant of the stacking device (7) and of the handling device (28).

In the work area of the handling unit (29), the handling device (28) has a temporary storage unit (52), which may also be present as multiple devices. The temporary storage unit (52) is used for receiving one or more slip-on containers (4). The slip-on containers (4) may be present individually or may be stacked on top of each other to form an intermediate stack (54). The slip-on containers (4) may be empty or may be filled with a layer of products (3).

The temporary storage unit (52) is arranged at the movable support (36) and is moved along the driving aisle by the handling device (28), especially by the movable handling unit (29) during the travel movement.

The temporary storage unit (52) has a rigid or vertically movable storage unit bottom (53), which is configured for the reception of an individual slip-on container (4) or of an intermediate stack (54). The storage unit bottom (53) may be adjustable, especially vertically adjustable, independently and relative to the supporting bottom (30). The storage unit bottom (53) is configured and arranged, e.g., according to FIGS. 10 and 11 such that the individual slip-on container (4) or the intermediate stack (54) is located next to the supporting bottom (30). This may be, e.g., an arrangement in the direction of travel along the driving aisle in front of the supporting bottom (30). The temporary storage unit (52) may be arranged, e.g., at the drive carrier (38) of the movable support (36).

The handling unit (29) may store the slip-on containers (4) in the respective temporary storage unit (52) and remove same again from the temporary storage unit (52). In this case, a storage area is especially provided on the storage unit bottom (53). The handling unit (29) may for this purpose comprise a further movability in the direction towards the temporary storage unit (52) and back in addition to the lateral displacement kinematics transversely to the driving aisle, which movability is symbolized by means of arrows in FIGS. 10 and 11. The further movability may comprise, e.g., a pushing function and/or a lifting-over function.

FIG. 11 shows a variant in case of the embodiment of the handling unit (29). The handling unit is configured, e.g., as a multi-axis industrial robot that already has the above-mentioned kinematics with the lateral displacement and lifting and lowering of the slip-on containers (4) as well as with the feeding and discharge of the slip-on containers (4) in and out of the temporary storage unit (52). The handling tool (32) may be configured in the above-described manner and may be arranged, e.g., at the multi-axis robot hand.

In another embodiment, not shown, the handling unit (29) is configured, e.g., according to FIGS. 8 and 9, wherein it additionally has a movability in the direction towards the temporary storage unit (52), e.g., along the driving aisle. In addition, it is possible to equip the handling unit (29) with an additional pusher, which displaces, e.g., a slip-on container (4) from the supporting bottom (30) into the temporary storage unit (52) and back. Here, the slip-on container (4) may be moved back and forth, e.g., on the storage unit bottom (53) or on the upper container bottom (43) of an intermediate stack (54).

FIG. 11 illustrates, in addition, a variant of the movable support (36) and of the drive carrier (38). The drive carrier (38) is configured, e.g., as a vehicle, e.g., as an AGV, which is floor-mounted and rolls on the plant floor and also is independently controllable. Furthermore, the drive carrier (38) may comprise a, e.g., column-like, upright frame with suitable adjusting devices for the vertical adjustment of the handling unit (29), of the supporting bottom (30) and of the temporary storage unit (52), if applicable.

FIG. 10 shows another variant of the handling device (28), in which the drive carrier (38) is arranged in a vertically adjustable manner in the above-described manner at a stationary support (37), e.g., at a portal. The temporary storage unit (52) may then likewise be arranged in a suitable manner at the drive carrier (38) in a rigid and vertically adjustable manner. In another embodiment, not shown, the temporary storage unit (52) may, as an alternative or in addition, be arranged in the direction of the driving aisle on the other side of the drive carrier (38) and, e.g., at a distance behind the supporting bottom (30).

In the case of the above-described and preferably gradual assembly and stacking up of a stack of containers (5), the handling unit (29) with the gripping tool (32) takes an empty slip-on container (4) from the temporary storage unit (52), moves same to a loading station (20, 21), loads a layer of products (3) there and pushes same with the slip-on container (4) or with a layer holder (31) onto the supporting bottom (30) and from there further onto the preferably mobile stack carrier (6) or onto the uppermost slip-on container (4) of an already begun stack of containers (5) at a stacking place (23, 24). The handling unit (29) then releases the filled and displaced slip-on container (4) and picks up a new empty slip-on container (4) from the temporary storage unit (52), with which the slip-on container the next layer of products (3) supplied is then received at the loading station (20, 21) and is stored in the stack of containers (5). The temporary storage unit (52) may accommodate a number of slip-on containers (4) that corresponds to the number of containers needed for a stack of containers. The temporary storage unit may also accommodate a smaller number of containers, wherein the emptied temporary storage unit (52) can then be filled up again at a supply unit (27), as needed.

In case of the preferably gradual unstacking or taking down of a stack of containers (5), the above-described process runs in the reverse order. The handling unit (29) grips the uppermost slip-on container (4) with the layer of products (3) from the stack of containers (5) and pushes the slip-on container over the supporting bottom (30) to a loading station (20, 21). The slip-on container (4) is then picked up from the layer of products (3) and brought into the temporary storage unit (52), wherein the next full slip-on container (4) is then gripped and displaced from the stack of containers (5). When the storage capacity of the temporary storage unit (52) is depleted, the intermediate stack (54) can be released at a supply unit (27). Variations of the embodiments being shown and described are possible in different manners. The features of the above-described exemplary embodiments may, in particular, be combined with one another and even transposed within the framework of the claims. The handling device (29) may be configured in a different manner, e.g., in the form of an articulated-arm robot with an output-side and preferably multi-axis robot hand. The robot links and the robot hand may form the tool guide (33), wherein the handling tool (32) is held by the robot hand and can be configured in an identical or similar manner as in the exemplary embodiment shown.

While specific embodiments of the invention have been shown and described in detail to illustrate the application of the principles of the invention, it will be understood that the invention may be embodied otherwise without departing from such principles.

LIST OF REFERENCE NUMBERS

1 Handling plant
2 Product, bottle
3 Layer of products
4 Slip-on container
5 Stack of containers
6 Stack carrier, mobile
7 Stacking device
8 Storage device
9 Transport device, AGV
10 Product feed device
11 Product discharge device
12 Product delivery unit, blow molder
13 Feed conveyor
14 Layer-forming device
15 Row-forming device
16 Discharge conveyor
17 Product handling device, filling plant
18 Stacking-up area
19 Unstacking area
20 Loading station for product feed
21 Loading station for product discharge
22 Row arrangement
23 Stacking place
24 Stacking place
25 Positioning device
26 Supply unit for stack carriers
27 Supply unit for slip-on containers
28 Handling device
29 Handling unit for slip-on containers
30 Supporting bottom
31 Layer holder
32 Handling tool
33 Tool guide
34 Holder actuator
35 Centering unit
36 Support
37 Support device, portal
38 Drive carrier
39 Carrier top
40 Carrier bottom
41 Transport receiver
42 Container wall
43 Container bottom
44 Container opening
45 Catch mechanism
46 Guide device
47 Transporting aisle
48 Stack storage area
49 Transport loader
50 Lifting device
51 Driving aisle
52 Temporary storage unit for slip-on containers
53 Storage unit bottom
54 Intermediate stack

The invention claimed is:

1. A stacking device for products in the form of layers of products,
wherein the stacking device is configured to load each of the layers of products in a box form and stackable slip-on container, which is open at the bottom, and to store said layers of products with this slip-on container in a stack of containers, and/or to transfer layers of products in slip-on containers from a stack of containers and to unload the particular layer of products from the slip-on container, the stacking device comprising:
a stacking place for a stack of containers;
a handling device having a multi-axially movable handling unit for slip-on container handling and, if applicable, the layer of products accommodated in each slip-on container, wherein the handling unit is configured to handle the slip-on containers, which are open at the bottom, and wherein layers of products in the stack of containers are located on a container bottom of a lower slip-on container and are enclosed laterally and at the top thereof by an upper slip-on container arranged above the layers of products, wherein a plurality of stacking places are provided in a row arrangement and the handling device comprises a movable support, which is configured to move the handling unit along a first, facing side of the row arrangement, wherein the stacking device has a row arrangement of the plurality of stacking places and the handling device comprises a movable support, which is configured to move the handling unit along a first, facing side of the row arrangement one or more loading stations in the work area of the handling device for receiving and/or releasing a layer of products; and one or more loading stations in the work area of the handling device for receiving and/or releasing a layer of products, wherein the handling device has a supporting bottom, which is carried along with the handling unit, the supporting bottom being vertically adjustable and being configured for direct or indirect accommodation of a layer of products during the transport thereof between loading station and stacking place and/or a stack of containers located at the loading station and/or the stacking place, wherein the handling unit is configured to hold and handle a box form slip-on container, which is configured with a front-side container opening, which is able to enclose the layer of products in a position with the container opening pointing downwards and thereby to place same over a layer of products or to remove same from a layer of products, wherein the handling unit performs a lifting and lowering motion during the handling with the slip-on container.

2. The stacking device in accordance with claim 1, wherein the stacking device is configured to stack up and/or to unstack a stack of containers at the stacking places, wherein the stacking device is configured to assemble the stack of containers gradually during the storage of the layers of products and to take down the stack of containers gradually during the transfer of the layers of products.

3. The stacking device in accordance with claim 1, wherein the support comprises a stationary support device and a drive carrier movable on the stationary support device, wherein the handling unit is arranged at the drive carrier in a stationary or movable manner, wherein the stationary support device extends along the row arrangement and is configured as a bottom guide or as a portal.

4. The stacking device in accordance with claim 1, wherein the handling unit is configured to move the slip-on container laterally and transversely to the stacking place, during the handling, wherein the handling unit is configured to displace the slip-on container together with a layer of products that is accommodated therewith during the handling between the stacking place, the supporting bottom and the loading station.

5. The stacking device in accordance with claim 1, wherein the handling device comprises a layer holder associated with the handling unit, wherein the layer holder has a movable centering unit and a holder actuator.

6. A stacking device for products in the form of layers of products, wherein the stacking device is configured to load each of the layers of products in a box form and stackable slip-on container, which is open at the bottom, and to store said layers of products with this slip-on container in a stack of containers, and/or to transfer layers of products in slip-on containers from a stack of containers and to unload the particular layer of products from the slip-on container, the stacking device comprising:

a stacking place for a stack of containers;

a handling device having a multi-axially movable handling unit for slip-on container handling and, if applicable, the layer of products accommodated in each slip-on container, wherein the handling unit is configured to handle the slip-on containers, which are open at the bottom, and wherein layers of products in the stack of containers are located on a container bottom of a lower slip-on container and are enclosed laterally and at the top thereof by an upper slip-on container arranged above the layers of products, wherein a plurality of stacking places are provided in a row arrangement and the handling device comprises a movable support, which is configured to move the handling unit along a first, facing side of the row arrangement, wherein the stacking device has a row arrangement of the plurality of stacking places and the handling device comprises a movable support, which is configured to move the handling unit along a first, facing side of the row arrangement one or more loading stations in the work area of the handling device for receiving and/or releasing a layer of products; and one or more loading stations in the work area of the handling device for receiving and/or releasing a layer of products, wherein the handling device has a supporting bottom, which is carried along with the handling unit, the supporting bottom being vertically adjustable and being configured for direct or indirect accommodation of a layer of products during the transport thereof between loading station and stacking place and/or a stack of containers located at the loading station and/or the stacking place, wherein the handling device has, in the work area of the handling unit, at least one temporary storage unit for slip-on containers, which are empty and/or filled with a layer of products, wherein the temporary storage unit is arranged at the movable support and is carried along by the mobile handling unit, and wherein the temporary storage unit has a rigid or vertically adjustable storage unit bottom, which is configured for receiving an individual slip-on container or an intermediate stack from a plurality of slip-on containers.

7. The stacking device in accordance with claim 6, wherein the handling unit is configured to move a slip-on container to the temporary storage unit and back as well as, if applicable, to stack up and/or unstack slip-on containers at the temporary storage unit.

8. The stacking device in accordance with claim 6, wherein the handling unit has a handling tool for the detachable holding of a slip-on container and a movable tool guide.

9. A stacking device for products in the form of layers of products, wherein the stacking device is configured to load each of the layers of products in a box form and stackable slip-on container, which is open at the bottom, and to store said layers of products with this slip-on container in a stack of containers, and/or to transfer layers of products in slip-on containers from a stack of containers and to unload the particular layer of products from the slip-on container, the stacking device comprising:

a stacking place for a stack of containers;

a handling device having a multi-axially movable handling unit for slip-on container handling and, if applicable, the layer of products accommodated in each slip-on container, wherein the handling unit is configured to handle the slip-on containers, which are open at the bottom, and wherein layers of products in the stack of containers are located on a container bottom of a lower slip-on container and are enclosed laterally and at the top thereof by an upper slip-on container arranged above the layers of products, wherein a plurality of stacking places are provided in a row arrangement and the handling device comprises a movable support, which is configured to move the handling unit along a first, facing side of the row arrangement, wherein the stacking device has a row arrangement of the plurality of stacking places and the handling device comprises a movable support, which is configured to move the handling unit along a first, facing side of the row arrangement one or more loading stations in the work area of the handling device for receiving and/or releasing a layer of products; and one or more loading stations in the work area of the handling device for receiving and/or releasing a layer of products, wherein the handling device has a supporting bottom, which is carried along with the handling unit, the supporting bottom being vertically adjustable and being configured for direct or indirect accommodation of a layer of products during the transport thereof between loading station and stacking place and/or a stack of containers located at the loading station and/or the stacking place, wherein the stacking device has a supply unit for at least one mobile stack carrier of a stack of containers and/or a supply unit for at least one empty slip-on container in the work area of the handling device, and wherein the stacking device has at least one mobile stack carrier for a stack of containers, wherein the mobile stack carrier has a carrier top, a carrier bottom and a transport receiver, wherein the carrier top is configured to accommodate a layer of products and slip-on container, which is open at the bottom, wherein the carrier bottom is configured to form a defined supporting surface for the stack carrier and wherein the carrier bottom is adapted to a positioning device and/or to a slip-on container top with a respective guiding function.

10. A handling plant for products, the handling plant comprising a stacking device for the products in the form of layers of products, wherein the stacking device is configured to load each of the layers of products in a box form and stackable slip-on container, which is open at the bottom, and to store said layers of products with slip-on container in a stack of containers, and/or to transfer layers of products in slip-on containers from a stack of containers and to unload the particular layer of products from the slip-on container the stacking device comprising:

a stacking place for a stack of containers;

a handling device having a multi-axially movable handling unit for the slip-on container and, if applicable, the layer of products accommodated in each of them, wherein the handling unit is configured to handle slip-on containers, which are open at the bottom, and wherein the layers of products in the stack of containers are located on a container bottom of a lower slip-on container and are enclosed laterally and at the top thereof by an upper slip-on container arranged above the stack of containers, wherein the stacking device has a row arrangement of the plurality of stacking places and the handling device comprises a movable support, which is configured to move the handling unit along a first, facing side of the row arrangement, one or more loading stations in the work area of the handling device for receiving and/or releasing a layer of products; and one or more loading stations in the work area of the handling device for receiving and/or releasing a layer of products, wherein the handling device has a supporting bottom, which is carried along with the handling unit, the supporting bottom being vertically adjustable and being configured for direct or indirect accommodation of a layer of products during the transport thereof between loading station and stacking place and/or a stack of containers located at the loading station and/or the stacking place, wherein the handling plant has a product feed device that is connected to a loading station of the stacking device and/or a product discharge device that is connected to a loading station of the stacking device, wherein the product feed device has a layer-forming device and wherein the product discharge device comprises a row-forming device.

11. The handling plant in accordance with claim 10, wherein the handling plant has a storage device for stacks of containers comprising slip-on containers.

12. A method for stacking products in the form of layers of products by means of a stacking device, the method comprising:

with the stacking device loading the layers of products each in a box form and stackable slip-on container, which is open at the bottom; and storing the layers of products with the slip-on containers in a stack of containers, and/or transferring the layers of products in slip-on containers from a stack of containers and unloading the respective layer of products from the slip-on container; and providing the stacking device, such that the stacking device comprises:

a stacking place for a stack of containers;

a handling device with a multi-axially movable handling unit for the slip-on container and each layer of products accommodated therein, if applicable, wherein the handling unit handles the slip-on containers open at the bottom and wherein the layers of products in the stack of containers are located on a container bottom of a lower slip-on container and are enclosed laterally and at the top thereof by an upper slip-on container arranged over the lower slip-on container, wherein the stacking device has a row arrangement of a plurality of stacking places and the handling device comprises a movable support, which moves the handling unit along a first, facing side of the row arrangement; and one or more loading stations in the work area of the handling device for receiving and/or releasing a layer of products, wherein the handling device has a supporting bottom, which is carried along with the handling unit, the supporting bottom being vertically adjustable and being configured for the direct or indirect accommodation of a layer of products during the transport thereof between a loading station and a stacking place or and a stack of containers located at the loading station and/or the stacking place, wherein a respective stack of containers consisting of slip-on containers with respective layers of products accommodated therein is gradually assembled and/or gradually taken down at the storage places, wherein layers of products are accommodated for storing or discharged for transferring at one or more loading stations, and wherein the slip-on containers with each layer of products accommodated therein are displaced by the handling unit over a carried-along supporting bottom between the storage places and the loading stations and wherein during the gradual assembly of a stack of containers, the empty slip-on containers, which are used for storing the layer of products, are each fed by the handling device from a carried-along temporary storage unit and/or from a supply unit for slip-on containers.

13. The stacking method in accordance with claim 12, wherein during the gradual taking down of a stack of containers, the slip-on containers, which are emptied during the transfer of the layer of products, are each discharged by the handling device to a carried-along temporary storage unit and/or to a supply unit for slip-on containers.

14. A stacking method in accordance with claim 12, wherein the handling tool is configured, as a controllable gripper, which is configured to grip a slip-on container in a positive-locking manner and which can perform both a lifting and lowering motion and also a driving and displacing motion along a tool guide, which is oriented transversely to a driving aisle, wherein in an extended position, the movable tool guide extends beyond a stacking place and a loading station, wherein the tool guide can be moved into a position with a reduced interfering contour for the vehicle operation along the driving aisle.

* * * * *